(No Model.)
M. SCHUBERT.
Tobacco and Plant Hillers.
No. 235,576. Patented Dec. 14, 1880.
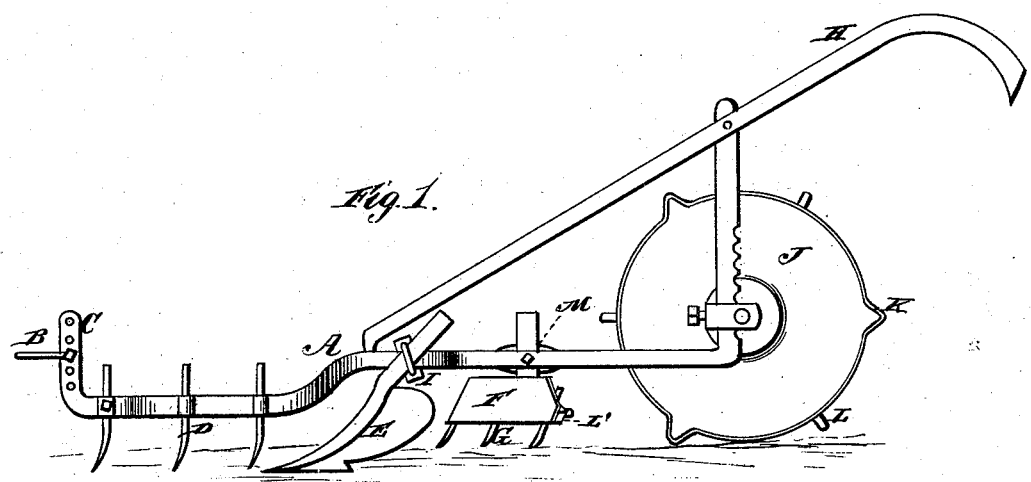
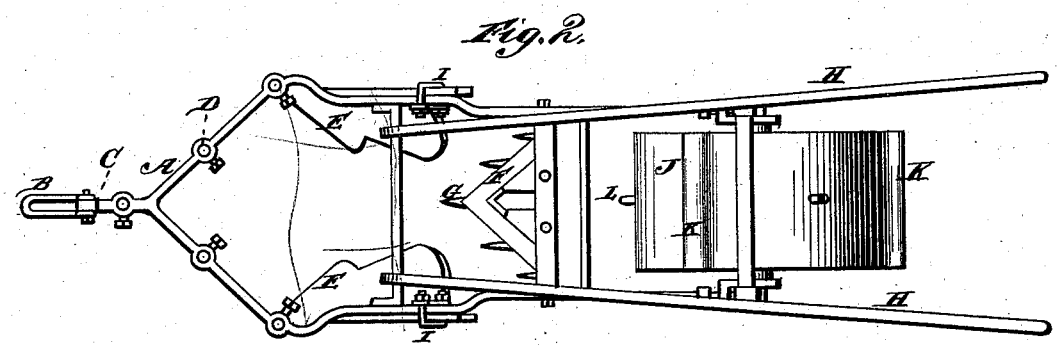
WITNESSES
Robert Emmett
Chas. G. Page.
INVENTOR
Maurice Schubert,
Gilmore, Smith & Co.
ATTORNEYS

UNITED STATES PATENT OFFICE.

MAURICE SCHUBERT, OF DOVER, KENTUCKY.

TOBACCO AND PLANT HILLER.

SPECIFICATION forming part of Letters Patent No. 235,576, dated December 14, 1880.

Application filed April 10, 1880. (No model.)

*To all whom it may concern:*

Be it known that I, MAURICE SCHUBERT, a citizen of the United States, residing at the town of Dover, in the county of Mason and State of Kentucky, have invented certain new and useful Improvements in Tobacco and Plant Hillers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my tobacco and plant hiller, and Fig. 2 is a plan view of the same.

My invention relates to a tobacco-hiller; and it consists in the features of construction and combination hereinafter set forth and claimed.

In the drawings, A designates the main frame of the machine.

B is the clevis to which the single-tree is connected. This clevis is adjustable in a series of holes in a curved extension, C, of the main frame, thereby admitting of a variation in the line of draft.

D are adjustable teeth, and E are adjustable shovels.

F is a scraper, having teeth G. This scraper is made vertically adjustable.

H are the handles, and J is a roller with flanges K. This roller has studs L, as shown. This roller is adjustable in the frame, so that the hills may be made high or low. The roller will be covered with zinc or other metal, which prevents the dirt from adhering to it.

The main frame will usually be made of iron, and its front triangular part contains five teeth, as hereinbefore set forth. These teeth stir up the ground and rake aside the trash, so that it will not interfere with the operation of the shovels. The points of these five teeth incline forward, so as to give them a better tendency to collect the trash upon the ground. They also serve to steady the implement while it is being drawn along. The set-screws admit of the teeth being adjusted vertically, so as to make them run deep or shallow.

The shovels are bolted on shafts which are attached to the main frame by clamps I I, whereby the shovels may be adjusted deep or shallow. These shovels throw the dirt inward, and form a ridge the width of the hill, which may be from ten to fourteen inches. The shovels may be brought nearer together by setting the shafts to the inside of the main frame by reversing the clamps which secure them to said frame.

The teeth of the scraper are vertically adjustable by means of set-screws L', and the rectangular bar of the scraper is adjustable in grooves M of the main frame. The scraper levels the top of the ridge made by the shovels, and the teeth rake any clods or trash out of the ridge. The roller completes the hills, the cogs or flanges thereon making depressions across the ridge and thus spacing off the hills, the pins or studs making depressions in the center of the hills to show where to set the plants. The roller is also adjustable in the main frame, so that the hills may be made high or low.

What I claim is—

1. In a tobacco-hilling machine, the scraper F, having adjustable teeth, as specified.

2. In a tobacco-hiller, the herein-described cylinder, formed with transverse ribs K and having the pins L, substantially as set forth.

In testimony that I claim the above I have hereunto subscribed my name in the presence of two witnesses.

MAURICE SCHUBERT.

Witnesses:
F. M. SMITH,
C. T. SULLIVAN.